United States Patent [19]

Judd et al.

[11] 4,130,191

[45] Dec. 19, 1978

[54] SPRAG CLUTCH ASSEMBLY

[75] Inventors: Carl R. Judd, Ithaca; Howard D. Snyder, Jr., Newfield, both of N.Y.

[73] Assignee: Borg-Warner Corporation, Chicago, Ill.

[21] Appl. No.: 825,326

[22] Filed: Aug. 17, 1977

[51] Int. Cl.² ............................................. F16D 41/07
[52] U.S. Cl. ....................................... 192/41 A; 192/45.1
[58] Field of Search ........................... 192/41 A, 41.5; 188/82.8

[56] References Cited

U.S. PATENT DOCUMENTS

| | | | |
|---|---|---|---|
| 2,892,523 | 6/1959 | Zlotek | 192/45.1 |
| 3,049,206 | 8/1962 | Zlotek | 192/45.1 |
| 3,075,623 | 1/1963 | Lund | 192/45.1 |
| 3,302,761 | 2/1967 | Zlotek | 192/45.1 |
| 3,498,429 | 3/1970 | Frakes | 192/45.1 |

*Primary Examiner*—Allan D. Herrmann
*Attorney, Agent, or Firm*—Aubrey L. Burgess

[57] ABSTRACT

A sprag clutch assembly which comprises an inner and an outer race, sprags between the races, a sprag retainer having its cross bars closely adjacent the inner race and contracting garter springs surrounding footed portions of the sprags. The assembly finds particular use in indexing applications where the indexing rate and the accuracy required are high.

1 Claim, 2 Drawing Figures

SPRAG CLUTCH ASSEMBLY

BACKGROUND OF THE INVENTION

The use of cam or sprag clutches in indexing applications is well known. Every clutch has an upper limit to its indexing performance regulated by the speed at which the cam can respond to the input. If the cam cannot respond quickly enough the cam will slide on the race for some distance until it rocks and engages the races to transmit torque. The upper speed at which this sliding occurs is regulated by the energizing force on the cam, e.g. the spring force that pushes the cam against the inner and outer races, and the inertia of the cam and cage that must be moved to allow the cam to rock into engagement with the races. Highest indexing rates are achieved by increasing the energizing force and/or reducing the inertia of the parts that must be accelerated and decelerated.

THE INVENTION

The clutch of this invention is usable in indexing applications where the indexing rate is high and the degree of accuracy required is also high. In the clutch of this invention, the cage is closely adjacent to the inner race where it is not subjected to reversing motions as are cages of more conventional constructions where the cages are closely adjacent to the outer races. The placement of the cage as in this invention reduces the inertia by reducing the radius at which the cage mass is located and reduces the effect of this inertia by eliminating the back and forth motion of a cage of the prior art construction, i.e. closely adjacent to the outer race.

The construction according to this invention allows the use of contracting garter springs rather than the expanding garter springs used in the prior art constructions. Contracting garter springs allow a much higher force to be imparted to the cams than can be obtained with similar sized expanding garter springs.

THE DRAWINGS

FIG. 1 is a partial side view of a clutch according to this invention with parts broken away to show details; and FIG. 2 is a sectional view taken on line 2—2 of FIG. 1.

DETAILED DESCRIPTION

Figure 1:
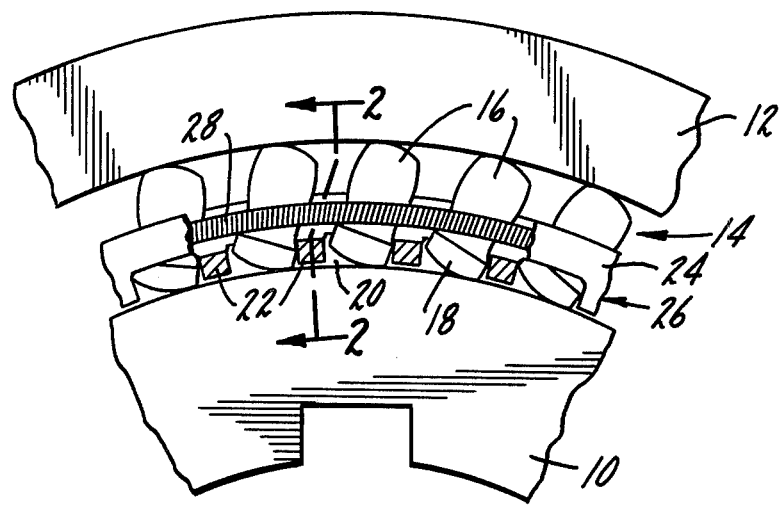
Figure 2:
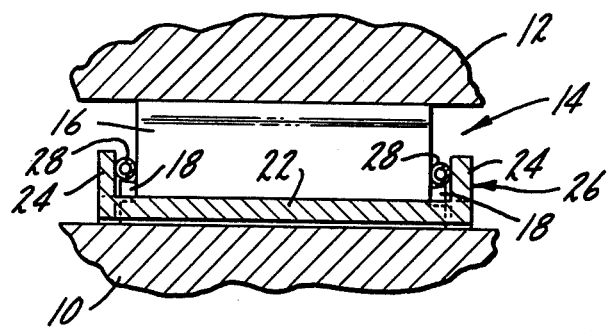

The clutch of this invention comprises inner and outer races 10 and 12, respectively, defining an annular space 14 therebetween, and a plurality of circumferentially spaced sprags or cams 16 in the space 14 between the races. The cams 16 have axially extending footed portions 18 which are received in spaces 20 between cross bars 22 connected to spaced rings 24, the cross bars and rings forming a cage 26. As noted from the drawing, the cage cross bars 22 are positioned closely adjacent to the inner race 10; the rings 24 prevent the cams from moving axially. Contracting garter springs 28 engage the footed portions 18 of the sprags 16 and urge the cams into race engaging positions.

Looking at FIG. 1, the outer race 12 is the drive race; when moved counterclockwise (as viewed in the drawings) the cams, being urged to pivot in a counterclockwise direction, lock-up and provide a connection between the races, so that the inner race 10 is rotated counterclockwise. Rotation or movement of the outer race in a clockwise direction causes the cams to slip on the races and no drive is transmitted to the inner race. In indexing applications, the drive is transmitted (upon counterclockwise movement of the outer race) immediately to the inner race because of the improved response of the cams due to the function of the garter springs.

What is claimed is:

1. A sprag clutch assembly especially usable in indexing applications where the indexing rates and degree of accuracy are high comprising:
   an inner race and an outer race, said races defining an annular space therebetween;
   a plurality of circumferentially spaced sprags in said annular space;
   each sprag having a body portion with race engaging surfaces and axially extending footed portions;
   each footed portion being defined in part by an upper surface which diverges from said body portion;
   said axially extending footed portions being closely adjacent said inner race;
   a sprag retainer in said annular space comprising axially spaced rings joined by cross bars, each adjacent pair of cross bars defining an opening in which a footed portion of a sprag is received;
   said cross bars being closely adjacent said inner race; and
   at least one contracting garter spring encircling said footed portions of said sprag and engaging the diverging surfaces thereof.

* * * * *